(12) United States Patent
Whear et al.

(10) Patent No.: US 7,498,369 B2
(45) Date of Patent: Mar. 3, 2009

(54) ULTRAHIGH MOLECULAR WEIGHT POLYETHYLENE ARTICLES AND METHOD OF MANUFACTURE

(75) Inventors: J. Kevin Whear, Utica, KY (US); Joseph G. Yaritz, Utica, KY (US)

(73) Assignee: Daramic LLC, Charlotte, NC (US)

( * ) Notice: Subject to any disclaimer, the term of this patent is extended or adjusted under 35 U.S.C. 154(b) by 366 days.

(21) Appl. No.: 11/070,511

(22) Filed: Mar. 2, 2005

(65) Prior Publication Data

US 2005/0245653 A1    Nov. 3, 2005

Related U.S. Application Data

(62) Division of application No. 10/121,278, filed on Apr. 12, 2002, now Pat. No. 7,238,744.

(51) Int. Cl.
*H01M 2/14* (2006.01)

(52) U.S. Cl. .................. 524/123; 524/82; 524/366; 524/394; 524/400; 524/474; 524/490; 524/492; 524/585; 524/586; 429/129; 429/247; 429/249; 429/250; 429/252; 429/254

(58) Field of Classification Search ................ 524/585, 524/492, 474, 82, 586, 394, 400, 366, 490, 524/123; 429/129, 247, 249, 250, 252, 254
See application file for complete search history.

(56) References Cited

U.S. PATENT DOCUMENTS

| 3,346,547 | A | * | 10/1967 | Cohen .................. 524/131 |
|---|---|---|---|---|
| 3,351,495 | A | | 11/1967 | Larsen et al. |
| 4,588,633 | A | | 5/1986 | Kono et al. |
| 4,699,857 | A | * | 10/1987 | Giovannoni et al. ........ 429/204 |
| 4,833,172 | A | | 5/1989 | Schwarz et al. |
| 4,861,644 | A | | 8/1989 | Young et al. |
| 4,892,779 | A | | 1/1990 | Leatherman et al. |
| 5,230,843 | A | | 7/1993 | Howard et al. |
| 5,234,652 | A | | 8/1993 | Woodhams et al. |
| 5,246,798 | A | * | 9/1993 | Yaacoub .................. 429/249 |
| 5,248,461 | A | | 9/1993 | Pluyter et al. |
| 5,281,491 | A | | 1/1994 | Rein et al. |
| 5,318,866 | A | | 6/1994 | Degen et al. |
| 5,326,391 | A | * | 7/1994 | Anderson et al. ............ 106/409 |
| 5,336,573 | A | * | 8/1994 | Zuckerbrod et al. ......... 429/252 |
| 5,399,308 | A | | 3/1995 | Woodhams et al. |
| 5,422,061 | A | * | 6/1995 | Takahashi et al. ........... 264/571 |
| 5,479,952 | A | | 1/1996 | Zachariades et al. |
| 5,583,171 | A | | 12/1996 | Schwarz et al. |
| 5,618,642 | A | | 4/1997 | Samii et al. |
| 5,641,565 | A | | 6/1997 | Sogo |
| 5,665,488 | A | * | 9/1997 | Young et al. ................. 429/143 |
| 5,683,634 | A | | 11/1997 | Fujii et al. |
| 5,863,466 | A | * | 1/1999 | Mor .......................... 252/500 |
| 5,922,492 | A | | 7/1999 | Takita et al. |
| 5,948,557 | A | * | 9/1999 | Ondeck et al. ................. 429/33 |
| 6,124,059 | A | * | 9/2000 | Bohnstedt et al. ........... 429/252 |
| 6,242,127 | B1 | | 6/2001 | Paik et al. |
| 6,372,379 | B1 | | 4/2002 | Samii et al. |
| 6,403,264 | B1 | | 6/2002 | Bunsch et al. |
| 6,485,867 | B1 | | 11/2002 | Navarrete et al. |
| 6,524,742 | B1 | | 2/2003 | Emanuel et al. |
| 6,559,195 | B1 | | 5/2003 | Yamamoto et al. |
| 6,566,012 | B1 | * | 5/2003 | Takita et al. ................. 429/254 |
| 6,586,138 | B2 | | 7/2003 | Pekala et al. |
| 6,666,969 | B1 | | 12/2003 | Funaoka et al. |

* cited by examiner

*Primary Examiner*—Bernard Lipman
(74) *Attorney, Agent, or Firm*—Hammer & Associates, P.C.

(57) ABSTRACT

An article of manufacture comprises an ultrahigh molecular weight polyethylene (UHMWPE) mixed with a processing oil and a lubricant selected from the group consisting of fatty acid esters, ethoxylated fatty acid esters, glycol esters, PEG esters, glycerol esters, ethoxylated esters, sorbitol esters, ethoxylated sorbitol esters, aromatic ethoxylates, alcohol ethoxylates, mercaptan ethoxylates, modified ethoxylates, amide surfactants, phosphate esters, phosphonate esters, phosphite esters, alkyl sulfates, fatty acid ethers, alkyl ether sulfates, alkylaryl ether sulfates, sulfonates, naphthalene sulfonates, sulfosuccinates, sulfonated esters, sulfonated amides, alkyl ether carboxylates, alkylaryl ether carboxylates, quaternary amines, amino quaternary amines, ethoxylated amines, imidazoline derivatives, betaines, sultaines, aminopropionate, catechol derivatives, saturated fatty acids, unsaturated fatty acids, and combinations thereof. The method for making those articles is also disclosed.

11 Claims, No Drawings

ULTRAHIGH MOLECULAR WEIGHT POLYETHYLENE ARTICLES AND METHOD OF MANUFACTURE

REFERENCE TO RELATED CASES

This Application is a Divisional Application from application Ser. No. 10/121,278 filed Apr. 12, 2002, now U.S. Pat. No. 7,238,744.

FIELD OF THE INVENTION

The invention is directed to ultrahigh molecular weight polyethylene (UHMWPE) articles and their manufacture.

BACKGROUND OF THE INVENTION

UHMWPE is difficult to process because the resin does not flow when melted. Berins, M. L., ed., *Plastics Engineering Handbook of the Society of the Plastic Industry*, Chapman & Hall, New York City, N.Y. (1991), p. 52. Consequently, UHMWPE is processed by sintering, compression molding, ram extrusion, or gel processing. Sintering is a process where resins are agglomerated by solid-state diffusion. Heat and pressure are usually essential. Compression molding is a process where resins are shaped between the faces of a mold by heat and pressure. Ram extrusion is a process where resins are shaped by forcing it through a die. The force is provided by a ram. U.S. Pat. Nos. 5,234,652 and 5,399,308 disclose a dry extrusion process for a mixture consisting of resins and lubricant. Gel processing is a process where resins are formed into gels for subsequent processing. The gel is a dilute solution or suspension of resin in a solvent, e.g., an extractable solvent (or oil or plasticizer).

UHMWPE is gel spun into fibers. In gel spinning, the primary mechanism of solidification is the gelling of the polymer solution by cooling to form a gel filament consisting of precipitated polymer and solvent. Solvent removal is accomplished following solidification by washing in a liquid bath. This process is also used to form microporous films. See U.S. Pat. Nos. 4,588,633 and 5,248,461. In U.S. Pat. No. 4,588,633, the gel solution consists of 2-4% by weight of UHMWPE. See Examples 1-12. In U.S. Pat. No. 5,248,461, the gel solution consists of up to 20% by weight of UHMWPE. See Examples 1-20. These membranes are useful as, among other things, separators for electrochemical cells. See U.S. Pat. No. 4,588,633, column 4, lines 30-36 and U.S. Pat. No. 5,248,461, column 4, lines 57-60.

Another variant of gel processing is gel processing with a filler. For example, see U.S. Pat. Nos. 3,351,495, 4,833,172, and 5,948,557. Generally, UHMWPE, a processing oil (or plasticizer), and a filler are mixed in an extruder and subsequently made into microporous sheets. In U.S. Pat. No. 3,351,495, the solution consisted of up to 20% by volume of UHMWPE. See Examples 6, 8, 18, 19, 20, and 21. The microporous membranes formed were used as separators for batteries. See column 1, lines 24-33. In U.S. Pat. Nos. 4,833,172 and 5,948,557, a calcium/zinc stearate lubricant, PETRAC® CZ-81, is added to the solution. See Tables 1 and 2, respectively. The microporous membranes formed were used as labels, diffusion membranes, and separators. See U.S. Pat. No. 5,948,557, column 1, lines 27-41.

There is a need to improve the processability of UHMWPE.

SUMMARY OF THE INVENTION

An article of manufacture comprises an ultrahigh molecular weight polyethylene (UHMWPE) mixed with a processing oil and a lubricant selected from the group consisting of fatty acid esters, ethoxylated fatty acid esters, glycol esters, PEG esters, glycerol esters, ethoxylated esters, sorbitol esters, ethoxylated sorbitol esters, aromatic ethoxylates, alcohol ethoxylates, mercaptan ethoxylates, modified ethoxylates, amide surfactants, phosphate esters, phosphonate esters, phosphite esters, alkyl sulfates, fatty acid ethers, alkyl ether sulfates, alkylaryl ether sulfates, sulfonates, naphthalene sulfonates, sulfosuccinates, sulfonated esters, sulfonated amides, alkyl ether carboxylates, alkylaryl ether carboxylates, quaternary amines, amino quaternary amines, ethoxylated amines, imidazoline derivatives, betaines, sultaines, aminopropionates, catechol derivatives, saturated fatty acids, unsaturated fatty acids, and combinations thereof. The method for making those articles is also disclosed.

DESCRIPTION OF THE INVENTION

An article of manufacture is any shaped article. For example, articles of manufacture may include, but is not limited to, films, fibers, sheets, plates, slabs, bars, rods, billets, and blocks. Preferably, these articles are made by an extrusion process. These articles also may be microporous, for example, microporous sheets and films.

Ultrahigh molecular weight polyethylene (UHMWPE) is a polyethylene polymer having a weight average molecular weight greater than $5 \times 10^5$. The polymer is either a homopolymer of ethylene or a copolymer of ethylene, with at most 10 mol % of one or more alpha-olefins. The polymer may be a blend with UHMWPE comprising at least 50% by weight of the blend and the balance being other polymers, such as, for example, polyolefins and synthetic and natural rubbers. The preferred weight average molecular weight is greater than $2 \times 10^6$. The most preferred UHMWPE has a weight average molecular weight greater than $5 \times 10^6$. UHMWPE resins are commercially available as GUR from Ticona LLC of Summit, N.J., STAMYLAN from DSM of Geleen, Netherland, UTEC from Polyailden of Camacari, Brazil, and HI-ZEX Million, LUBMER, and MIPELON, each from Mitsui Chemical of Tokyo, Japan. GUR 4130 (molecular weight about 4-5 million) and GUR 4170 (molecular weight about 8-9 million) are preferred.

Processing oil (or processing plasticizer) have little solvating effect on the UHMWPE at lower temperatures (e.g. 60° C.), but have a significant solvating effect at elevated temperatures (e.g. 200°). Such oils include paraffinic oils, naphthalenic oils, and aromatic oils, as well as other materials including the phthalate ester plasticizers such as dibutyl phthalate, bis(2-ethylene)phthalate, diisodecyl phthalate, dicyclohexyl phthalate, butyl benzyl phthalate, and ditridecyl phthalate. Additional oils, plasticizers, and/or solvents are mentioned in U.S. Pat. Nos. 3,351,495; 4,588,633; 4,833,172; 5,248,461; and 5,948,557 are incorporated herein by reference.

The filler includes any particulate filler as is well known in the art. For example, see U.S. Pat. Nos. 3,351,495; 4,833,172; and 5,948,557 each is incorporated herein by reference. Preferably, the filler is a silica. Such fillers are commercially available under the tradename HiSil® from PPG Industries, Inc. of Pittsburgh, Pa., SIPERANT from Degussa AG of Wesseling, Germany, ZEOSIL from Rhodia, Inc. of Cranberry, N.J. or KETJENSIL from Akzo Chemie of Compiegne, France.

Minor amounts of auxiliary components may be added. Such auxiliary components include: carbon black, stabilizers, and antioxidants. The compounds are conventional and known in the art.

Lubricants are compounds that, when added to an UHMWPE mixture, improve the processability of the UHMWPE mixture. Improved processability refers to a reduction in fusion time (the time it takes the polymeric system to melt (or dissolve) into a flowable solution). Improved processability is also seen as a reduction in energy consumption by the motor and as a reduction in mixture temperature when comparing systems with and without the lubricants. The results arising from this phenomenon include, but are not limited to, decreasing energy consumption, decreased thermal and mechanical degradation of the polymer, increased polymer strength, decreased machine wear, and increased polymer throughputs.

Such lubricants are selected from the material classes consisting of: fatty acid esters, ethoxylated fatty acid esters, glycol esters, PEG esters, glycerol esters, ethoxylated esters, sorbitol esters, ethoxylated sorbitol esters, aromatic ethoxylates, alcohol ethoxylates, mercaptan ethoxylates, modified ethoxylates, amide surfactants, phosphate esters, phosphonate esters, phosphite esters, alkyl sulfates, fatty acid ethers, alkyl ether sulfates, alkylaryl ether sulfates, sulfonates, naphthalene sulfonates, sulfosuccinates, sulfonated esters, sulfonated amides, alkyl ether carboxylates, alkylaryl ether carboxylates, quaternary amines, amino quaternary amines, ethoxylated amines, imidazoline derivatives, betaines, sultaines, aminopropionate, catechol derivatives, saturated fatty acids, unsaturated fatty acids, and combinations thereof. Preferably, the lubricants are selected from the material classes consisting of: fatty acid esters, ethoxylated fatty acid esters, PEG esters, ethoxylated esters, sorbitol esters, ethoxylated sorbitol esters, aromatic ethoxylates, alcohol ethoxylates, phosphate esters, phosphonate esters, phosphite esters and combinations thereof. Most preferred are sorbitol esters, ethoxylated sorbitol esters, and aromatic ethoxylates.

Such lubricants are commercially available. An exemplary list is set out in the Table below. Such lubricants specifically exclude the metallic salts of stearic acid (e.g., Zn stearate and Ca stearate) and lubricants containing same.

TABLE

| Tradename or Abbreviation | General Class of Surfactants | Specific chemical | Company |
|---|---|---|---|
| Rhodasurf ® LA-12 | Alcohol Ethoxylates | Mixed linear alcohol ethoxylate | Rhodia HPCII |
| Rhodasurf ® LA-3 | Alcohol Ethoxylates | Mixed linear alcohol ethoxylate | Rhodia HPCII |
| Rhodapex ® CD-128 | Alkyl (and Alkyllaryl) Ether Sulfate | Ammonium Linear Alcohol Ether Sulfate | Rhodia HPCII |
| Rhodapon ® BOS | Alkyl Sulfates | Sodium 2-ethylhexyl Sulfate | Rhodia HPCII |
| Rhodapon ® UB | Alkyl Sulfates | Sodium Lauryl Sulfate | Rhodia HPCII |
| Alkamide ® STEDA/B | Amide surfactant | Ethylene Bisstearamide | Rhodia HPCII |
| Igepal ® CO-210 | Aromatic Ethoxylates | Nonylphenol ethoxylates | Rhodia HPCII |
| Igepal ® CO-630 | Aromatic Ethoxylates | Nonylphenol ethoxylates | Rhodia HPCII |
| Igepal ® RC-630 | Aromatic Ethoxylates | Dodecyl Phenol Ethoxylates | Rhodia HPCII |
| Mirataine ® CBS | Betaines, Sultaines, and Aminopropionates | Coco/Oleamidopropyl Betaine | Rhodia HPCII |
| Mirataine ® COB | Betaines, Sultaines, and Aminopropionates | Cocamidopropyl Hydroxy Sultaine | Rhodia HPCII |
| Miranate ® LEC-80 | Ether Carboxylate | Sodium Laureth 13 Carboxylate | Rhodia HPCII |
| Rhodameen ® PN-430 | Ethoxylated Fatty Amines | Ethoxylated (5 moles) tallow amine | Rhodia HPCII |
| Rhodameen ® T-50 | Ethoxylated Fatty Amines | Ethoxylated (50 moles) tallow amine | Rhodia HPCII |
| Calcium Stearate | Fatty acids, saturated | Calcium stearate | |
| Linseed Oil | Fatty acids, unsaturated | Linoleic and linolenic acids | Hardware Store |
| Tung Oil | Fatty acids, unsaturated | Eleostearic acid | Hardware Store |
| Alkamuls ® GMS | Glycerol ester | Glycerol stearate | Rhodia HPCII |
| Kemester ® 1000 | Glycerol trioleate | Glycerol trioleate | Crompton Corp. |
| Alkamuls ® EGDS | Glycol ester | Glycol distearate | Rhodia HPCII |
| Alkamuls ® JK | Guerbet ester | Guerbet diester | Rhodia HPCII |
| Neustrene ® 059 | Hydrogenated tallow glycerol | (30% Palmitic, 60% Stearic) | Crompton Corp. |
| Neustrene ® 064 | Hydrogenated tallow glycerol | (88% Stearic, 10% Palmitic) | Crompton Corp. |
| Miranol ® C2M-SF | Imidazoline derivative | Disodium Cocoampho Dipropionate | Rhodia HPCII |
| Miranol ® JEM | Imidazoline derivative | Sodium Mixed C8 Amphocarboxylate | Rhodia HPCII |
| Antarox ® 724/P | Ethoxylate | | Rhodia HPCII |
| Rhodacal ® N | Naphthalene Formaldehyde Sulfonates | Sodium Naphthalene Formaldehyde Sulfonate | Rhodia HPCII |
| Supragil ™ WP | Naphthalene Sulfonates | Sodium Diisopropyl Naphthalene Sulfonate | Rhodia HPCII |
| Alkamuls ® EL-620 | PEG Ester | PEG-30 Castor Oil (ricinoleic + oleic + palmitic . . . ) | Rhodia HPCII |
| Duraphos ® 2EHA PO4 | Phosphate Ester | Phosphoric Acid, Mono & Di(2-ethylhexyl) ester | Rhodia HPCII |
| DEHPA ® extractant | Phosphate Ester | Phosphoric Acid, Bis(2-ethylhexyl) ester | Rhodia HPCII |
| Rhodafac ® LO-11A LA | Phosphate Ester | Phosphoric Acid, Blend of linear octyl/decyl alcohol esters | Rhodia HPCII |

-continued

TABLE

| Tradename or Abbreviation | General Class of Surfactants | Specific chemical | Company |
|---|---|---|---|
| Amgard ® TOF | Phosphate Ester | Phosphoric Acid, Tris(2-ethylhexyl) ester | Rhodia HPCII |
| Albrite ® B(2EH) 2EHP | Phosphonate Ester | Phosphonic Acid, (2-ethylhexyl)-bis(2-ethylhexyl) ester | Rhodia HPCII |
| Octylphosphonic Acid | Phosphonate Ester | Octyl Phosphonic Acid Ester | Rhodia HPCII |
| Rhodaquat ® DAET-90 | Quaternary Amine | Complex ditallow sulfate quaternary amine | Rhodia HPCII |
| Alkamuls ® SML | Sorbitan ester | Sorbitan Monolaurate | Rhodia HPCII |
| Alkamuls ® SMO | Sorbitan ester | Sorbitan Monooleate | Rhodia HPCII |
| Alkamuls ® STO | Sorbitan ester, ethoxylated | Sorbitan Trioleate | Rhodia HPCII |
| OT-75, OT-100 | Sulfosuccinates | Dioctyl sodium sulfosuccinate | Cytec |

The components, UHMWPE, filler (optional), processing oil, and lubricant, are mixed. In formulations with filler, the weight ratio of polymer to filler may range from 1:1 to 1:5, 1:3 being preferred. The ratio of UHMWPE and filler to oil may range from 1:1 to 1:2, 1:1.5 being preferred. The lubricant may comprise up to 15 weight % of the formulation, with 0.2 to 8% being preferred. In formulation without filler, the polymer may comprise up to 80% by weight of the mixture, preferably in the range of 20-65% by weight. The ratio of oil to lubricant may range from 3:1 to 1:3, with the range of 2:1 to 1:2 being preferred. The components are preferably mixed in a continuous fashion, for example, in a twin screw extruder or a Brabender extruder or a screw extruder with a blown film die.

After mixing, the mixture is shaped. Shaping will depend upon the particular article desired, as is known in the art. For example, if a film or sheet is desired, then the appropriate die may be added to the extruder. After shaping, the articles are most often subjected to a step to remove the processing oil or solvent from the article (gel), (e.g., an extraction (or washing or leaching) step to remove processing oil and lubricant). This step is conventional. For example, see U.S. Pat. Nos. 3,351,495; 4,588,633; 4,833,172; 5,248,461; and 5,948,557 each is incorporated herein by reference. In formulations with filler, the extruded sheets are preferably subjected to an extraction step to remove processing oil. After extraction, these sheets may have about 0.5% (nominally 0%) to 30% by weight oil remaining, preferably 5-25%, and most preferably 10-20%. It is understood that it is impossible to remove all of the processing oil and lubricant from any of the mixtures, so at least a trace amount will remain in the final articles. In formulations without fillers, the extruded sheets are preferably subjected to an extraction step. After extraction, these sheets may have only residual amounts of oil and lubricant. Articles may be subjected to stretching or tentering before, during, or after extraction.

Preferably, these articles are formed into microporous sheets or films. Such microporous sheets and films may be used as labels, diffusion membranes, and separators in electrochemical devices (e.g., batteries, capacitors, and fuel cells). A battery is an electrochemical device having an anode, a cathode, an electrolyte, and a separator sandwiched between the anode and the cathode and impregnated with the electrolyte. Formulation with filler are used preferably in lead acid batteries. Formulations without filler are used preferably in lithium batteries.

EXAMPLES

In the following examples, set out in Tables 1-8, ultrahigh molecular weight polyethylene (GUR 4130 and GUR 4170 from Ticona LLC of Summit, N.J.), filler (specifically silica, HiSil from PPG of Pittsburgh, Pa.), processing oil (naphthalenic oil from Calumet Co. of Princeton, La.), and lubricant (as identified in the tables) were blended together and extruded from a twin screw extruder. The extruded product, a sheet, was subjected to an extraction step for the removal of processing oil. During extrusion, torque (% Kw) and melt temperature were measured for comparison to control (examples without additive) and indicates the amount of energy needed to mix the components. After extraction, the amount of oil remaining in the article of manufacture (final oil %) was determined by a extraction technique in which: a dried, 1.33 inch (3.38 cm)×6 inch (15.24 cm) piece of sheet was weighed (W1) and then immersed in 200 ml of fresh, room temperature hexane in a ultrasonic bath for at least 15 minutes; then the sample is dried and reweighed (W2). The % oil is [(W1-W2)/W1]*100. Two samples are averaged. Additionally, basis weight was measured in conventional fashion, and thickness (web) by ASTM D 374, MD tensile by ASTM D 638, porosity by Battery Council International (BCI) TM-3.207, and ER by BCI TM-3.218 using a conventional tester from Palico Instrument Limited of Circle Pines, Minn. Puncture strength generally follows ASTM D3763 except as noted below: The instrument used was a Chatillon digital force guage DFIS 10 on a motorized test stand TCM 201. Chatillon/Ametek is located in Largo, Fla. The puncture tip is slightly rounded and 1.930 mm in diameter, and the platform hole is 6.5 mm in diameter. The travel speed is set at 300 mm/min, and at least 10 measurements are averaged across a representative area of the sample. This method is generally independent of sample size, and representative area of the sample refers to across the width and length of a reasonably sized sample. The peak force needed to puncture the sample is recorded in units of N or lbs.

In Tables 1-5, ingredients were mixed at the throat of the extruder, and in Tables 6-8, the lubricant was injected through the extruder's barrel.

TABLE 1

| | | Examples | | | | | | | |
|---|---|---|---|---|---|---|---|---|---|
| | | 1 | 2 | 3 | 4 | 5 | 6 | 7 | 8 |
| Additive name | | | A | B | C | D | E | F | G |
| Polymer type | | 4170 | 4170 | 4170 | 4170 | 4170 | 4170 | 4170 | 4170 |
| Polymer | kg | 4.14 | 4.14 | 4.14 | 4.14 | 4.14 | 4.14 | 4.14 | 4.14 |
| Filler | kg | 10.76 | 10.76 | 10.76 | 10.76 | 10.76 | 10.76 | 10.76 | 10.76 |
| Additive | kg | 0.00 | 1.09 | 1.09 | 1.09 | 1.09 | 1.09 | 1.09 | 1.09 |
| Oil | kg | 27.50 | 26.41 | 26.41 | 26.41 | 26.41 | 26.41 | 26.41 | 26.41 |
| Torque | % KW | 26 | 24 | 25 | 27 | 24 | 25 | 26 | 24 |
| Melt Temp. | ° C. | 210 | 214 | 214 | 216 | 208 | 268 | 208 | 212 |
| Web Thickness | microns | 189.2 | 217.2 | 220.0 | 209.8 | 208.0 | 206.2 | 205.5 | 203.2 |
| Basis Weight | g/m$^2$ | 106.9 | 140.0 | 140.9 | 127.1 | 134.1 | 129.4 | 134.0 | 127.0 |
| Puncture | N | 11.9 | 24.3 | 23.6 | 24.2 | 17.8 | 20.0 | 19.2 | 16.8 |
| MD Tensile | N/mm$^2$ | 17.5 | 28.9 | 29.1 | 29.3 | 27.3 | 21.9 | 26.4 | 21.6 |
| Porosity | % | 63.1 | 60.2 | 60.1 | 61.9 | 65.6 | 63.2 | 59.0 | 61.1 |
| ER w/o Coating | mohm-cm$^2$ | 582.6 | 285.2 | 279.4 | 285.2 | 385.2 | 505.8 | 705.8 | 541.3 |
| Final Oil | % | 18.2 | 13.9 | 14.1 | 15.2 | 14.9 | 16.7 | 14.5 | 19.7 |

TABLE 2

| | | Examples | | | | | | | |
|---|---|---|---|---|---|---|---|---|---|
| | | 9 | 10 | 11 | 12 | 13 | 14 | 15 | 16 |
| Additive name | | | A | B | C | D | E | F | G |
| Polymer type | | 4130 | 4130 | 4130 | 4130 | 4130 | 4130 | 4130 | 4130 |
| Polymer | kg | 4.14 | 4.14 | 4.14 | 4.14 | 4.14 | 4.14 | 4.14 | 4.14 |
| Filler | kg | 10.76 | 10.76 | 10.76 | 10.76 | 10.76 | 10.76 | 10.76 | 10.76 |
| Additive | kg | 0.00 | 1.09 | 1.09 | 1.09 | 1.09 | 1.09 | 1.09 | 1.09 |
| Oil | kg | 27.50 | 26.41 | 26.41 | 26.41 | 26.41 | 26.41 | 26.41 | 26.41 |
| Torque | % KW | 28 | 24 | 26 | 27 | 25 | 28 | 25 | 26 |
| Melt Temp. | ° C. | 207 | 211 | 214 | 214 | 205 | 216 | 214 | 221 |
| Web Thickness | microns | 179.1 | 232.2 | 227.3 | 211.3 | 172.0 | 209.6 | 202.4 | 229.4 |
| Basis Weight | g/m$^2$ | 106.6 | 147.8 | 139.9 | 131.8 | 112.9 | 135.3 | 132.1 | 144.7 |
| Puncture | N | 11.8 | 20.4 | 21.0 | 17.0 | 14.2 | 16.6 | 15.9 | 14.8 |
| MD Tensile | N/mm$^2$ | 18.3 | 24.8 | 21.9 | 23.1 | 21.9 | 19.1 | 22.6 | 16.9 |
| Porosity | % | 67.2 | 60.7 | 63.7 | 63.0 | 61.6 | 63.6 | 60.6 | 62.2 |
| ER w/o Coating | mohm-cm$^2$ | 461.3 | 240.0 | 263.2 | 283.2 | 1652 | 361.3 | 362.6 | 471.6 |
| Final Oil | % | 23.8 | 13.4 | 15.6 | 13.7 | 22.8 | 14.7 | 14.3 | 13.7 |

TABLE 3

| | | Examples | | | | | |
|---|---|---|---|---|---|---|---|
| | | 17 | 18 | 19 | 20 | 21 | 22 |
| Additive name | | | A | B | C | F | H |
| Polymer type | | 4170 | 4170 | 4170 | 4170 | 4170 | 4170 |
| Polymer | kg | 3.10 | 3.10 | 3.10 | 3.10 | 3.10 | 3.10 |
| Filler | kg | 8.41 | 8.41 | 8.41 | 8.41 | 8.41 | 8.41 |
| Additive | kg | 0.00 | 0.82 | 0.82 | 0.82 | 0.82 | 0.82 |
| Oil | kg | 20.35 | 19.52 | 19.52 | 19.52 | 19.52 | 19.52 |
| Torque | % KW | 27 | 24 | 24 | 24 | 26 | 22 |
| Melt Temp. | ° C. | 208 | 211 | 210 | 211 | 210 | 208 |
| Web Thickness | microns | 173.0 | 161.5 | 177.8 | 180.1 | 177.8 | 191.3 |
| Basis Weight | g/m$^2$ | 111.7 | 119.6 | 107.3 | 123.5 | 126.3 | 140.3 |
| Puncture | N | 11.4 | 16.2 | 13.6 | 16.0 | 13.2 | 20.3 |
| MD Tensile | N/mm$^2$ | 20.3 | 34.5 | 18.4 | 24.2 | 20.6 | 26.5 |
| Porosity | % | 59.2 | 58.1 | 59.7 | 60.7 | 59.7 | 59.1 |
| ER w/o Coating | mohm-cm$^2$ | 434.8 | 127.7 | 145.8 | 248.4 | 435.5 | 76.1 |
| Final Oil | % | 14.0 | 13.7 | 13.9 | 13.7 | 12.9 | 12.8 |

TABLE 4

| | | Examples | | | | |
|---|---|---|---|---|---|---|
| | | 17 | 23 | 24 | 25 | 40 |
| Additive name | | | | A | H | A |
| Polymer type | | 4170 | 4130 | 4170 | 4170 | 4170 |
| Polymer | kg | 3.10 | 3.10 | 2.87 | 2.87 | 4.39 |
| Filler | kg | 8.41 | 8.41 | 9.20 | 9.20 | 11.86 |
| Additive | kg | 0.00 | 0.82 | 1.63 | 1.63 | 1.12 |
| Oil | kg | 20.35 | 20.35 | 18.78 | 18.78 | 26.99 |
| Torque | % KW | 27 | 24 | 23 | 23 | 23 |
| Melt Temp. | °C. | 208 | 209 | 211 | 208 | 216 |
| Web Thickness | microns | 173.0 | 177.8 | 180.3 | 172.7 | 114.3 |
| Basis Weight | g/m² | 111.7 | 113.3 | 135.4 | 137.4 | 83.8 |
| Puncture | N | 11.4 | 10.1 | 13.5 | 17.5 | 11.4 |
| MD Tensile | N/mm² | 20.3 | 16.9 | 21.6 | 32.8 | 27.1 |
| Porosity | % | 59.2 | 62.3 | 59.0 | 58.5 | 65.5 |
| ER w/o Coating | mohm-cm² | 434.8 | 464.5 | 78.1 | 64.5 | 36.1 |
| Final Oil | % | 14.0 | 14.6 | 12.5 | 11.6 | 14.7 |

TABLE 5

| | | Examples | | | | | |
|---|---|---|---|---|---|---|---|
| | | 26 | 31 | 27 | 28 | 29 | 30 |
| Additive name | | | | I | J | K | K |
| Polymer type | | 4130 | 4170 | 4170 | 4170 | 4170 | 4170 |
| Polymer | kg | 3.10 | 4.39 | 3.10 | 3.10 | 4.34 | 3.25 |
| Filler | kg | 8.41 | 11.86 | 8.41 | 8.41 | 11.75 | 8.81 |
| Additive | kg | 0.00 | 0.00 | 0.82 | 0.82 | 0.53 | 0.82 |
| Oil | kg | 20.35 | 28.66 | 19.52 | 19.52 | 27.86 | 20.48 |
| Torque | % KW | | 28 | 23 | 23 | 24 | 25 |
| Melt Temp. | °C. | | 217 | 217 | | 222 | 227 |
| Web Thickness | microns | 188.5 | 183.4 | 192.8 | 179.6 | 198.9 | 191.5 |
| Basis Weight | g/m² | 100.1 | 102.4 | 117.9 | 127.2 | 114.6 | 116.7 |
| Puncture | N | 9.6 | 13.1 | 16.8 | 22.0 | 11.5 | 12.8 |
| MD Tensile | N/mm² | 15.6 | 20.4 | 28.4 | 33.2 | 12.8 | 12.5 |
| Porosity | % | 63.0 | 66.3 | 62.5 | 61.1 | 66.2 | 65.9 |
| ER w/o Coating | mohm-cm² | 320.3 | 221.9 | 109.8 | 397.4 | 292.3 | 220.0 |
| Final Oil | % | 13.7 | 10.9 | 11.2 | 11.5 | 11.9 | 12.5 |

TABLE 6

| | | Examples | | | | | |
|---|---|---|---|---|---|---|---|
| | | 31 | 32 | 33 | 34 | 35 | 41 |
| Additive name | | | J | J | J | J | J |
| Polymer type | | 4170 | 4170 | 4170 | 4170 | 4170 | 4170 |
| Polymer | kg | 4.39 | 4.39 | 4.39 | 4.39 | 4.39 | 3.35 |
| Filler | kg | 11.86 | 11.86 | 11.86 | 11.86 | 11.86 | 9.04 |
| Additive | kg | 0.00 | 0.55 | 1.12 | 2.32 | 3.59 | 1.63 |
| Oil | kg | 28.66 | 27.83 | 26.99 | 25.25 | 23.42 | 23.59 |
| Torque | % KW | 28 | 28 | 26 | 24 | 25 | 24 |
| Melt Temp. | °C. | 217 | 210 | 207 | 205 | 204 | 204 |
| Web Thickness | microns | 183.4 | 175.3 | 182.9 | 162.6 | 170.2 | 182.9 |
| Basis Weight | g/m² | 102.4 | 119.2 | 122.2 | 126.0 | 141.2 | 118.5 |
| Puncture | N | 13.1 | 15.2 | 20.8 | 22.5 | 24.5 | 17.1 |
| MD Tensile | N/mm² | 20.4 | 24.3 | 38.2 | 48.8 | 48.5 | 22.1 |
| Porosity | % | 66.3 | 65.3 | 61.4 | 58.1 | 57.0 | 61.1 |
| ER w/o Coating | mohm-cm² | 221.9 | 198.7 | 282.3 | 1052.9 | 751.6 | 543.9 |
| Final Oil | % | 10.9 | 12.8 | 12.5 | 13.9 | 13.3 | 13.8 |

TABLE 7

| | | Examples | | | | |
|---|---|---|---|---|---|---|
| | | 31 | 36 | 37 | 38 | 39 |
| Additive name | | | H | H | H | H |
| Polymer type | | 4170 | 4170 | 4170 | 4170 | 4170 |
| Polymer | kg | 4.39 | 4.39 | 4.39 | 4.39 | 4.39 |
| Filler | kg | 11.86 | 11.86 | 11.86 | 11.86 | 11.86 |
| Additive | kg | 0.00 | 0.55 | 1.12 | 2.32 | 3.59 |
| Oil | kg | 28.66 | 27.83 | 26.99 | 25.25 | 23.42 |
| Torque | % KW | 28 | 25 | 24 | 26 | 27 |
| Melt Temp. | °C. | 217 | 213 | 201 | 200 | 204 |
| Web Thickness | microns | 183.4 | 170.2 | 182.9 | 183.6 | 167.6 |
| Basis Weight | g/m² | 102.4 | 108.2 | 152.2 | 145.4 | 156.4 |
| Puncture | N | 13.1 | 12.9 | 22.5 | 16.4 | 14.8 |
| MD Tensile | N/mm² | 20.4 | 21.3 | 46.7 | 38.3 | 33.4 |
| Porosity | % | 66.3 | 64.4 | 61.2 | 61.1 | 57.0 |
| ER w/o Coating | mohm-cm² | 221.9 | 46.5 | 223.9 | 593.5 | 150.3 |
| Final Oil | % | 10.9 | 14.1 | 12.9 | 13.8 | 12.5 |

TABLE 8

| | | Examples | | | | | | | |
|---|---|---|---|---|---|---|---|---|---|
| | | 49 | 42 | 43 | 44 | 45 | 46 | 47 | 48 |
| Additive name | | | L | M | N | O | P | Q | R |
| Polymer type | | 4170 | 4170 | 4170 | 4170 | 4170 | 4170 | 4170 | 4170 |
| Polymer | Kg | 3.25 | 3.25 | 3.25 | 3.25 | 3.25 | 3.25 | 3.25 | 3.25 |
| Filler | Kg | 8.79 | 8.79 | 8.79 | 8.79 | 8.79 | 8.79 | 8.79 | 8.79 |
| Additive | Kg | 0.00 | 0.82 | 0.82 | 0.82 | 0.82 | 0.82 | 0.82 | 0.82 |
| Oil | Kg | 21.27 | 20.34 | 20.34 | 20.34 | 20.34 | 20.34 | 20.34 | 20.34 |
| Torque | % KW | 24 | 24 | 24 | 24 | 23 | 24 | 23 | 24 |
| Melt Temp. | ° C. | 227 | 234 | 233 | 236 | 235 | 234 | 234 | 237 |
| Web Thickness | microns | 157.5 | 177.8 | 167.6 | 175.3 | 185.4 | 162.6 | 180.3 | 175.3 |
| Basis Weight | g/m$^2$ | 110.6 | 126.3 | 120.0 | 125.0 | 129.4 | 119.4 | 119.4 | 125.6 |
| Puncture | N | 10.6 | 18.5 | 15.9 | 18.5 | 16.4 | 17.5 | 13.8 | 17.4 |
| MD Tensile | N/mm$^2$ | 16.3 | 34.8 | 31.9 | 45.7 | 31.6 | 35.8 | 33.1 | 35.8 |
| Porosity | % | 64.5 | 61.6 | 62.5 | 63.0 | 63.4 | 61.7 | 63.0 | 63.7 |
| ER w/o Coating | mohm-cm$^2$ | 470.3 | 872.9 | 1707.1 | 201.3 | 376.1 | 225.2 | 294.8 | 19.4 |
| Final Oil | % | 13.6 | 12.5 | 12.7 | 14.3 | 14.0 | 14.8 | 15.5 | 14.3 |

In the following examples, set out in Table 9, ultrahigh molecular weight polyethylene (GUR 4130 from Ticona LLC of Summit, N.J.), processing oil (naphthalenic oil from Calumet Co. of Princeton, La.), and lubricant (as identified in the table) were blended together and extruded from a twin screw extruder. The extruded product was observed as it exited the extruder die and categorized by appearance scale 1-10. A rating of 10 meant a smooth product that appeared well mixed, and a rating of 1 meant a very grainy and rough appearance.

TABLE 9

| | Examples: | | | | | | | | | |
|---|---|---|---|---|---|---|---|---|---|---|
| | 46 | 47 | 48 | 49 | 50 | 51 | 52 | 53 | 54 | 55 |
| polymer wt % | 33.0 | 38.5 | 52.9 | 38.5 | 52.2 | 50.0 | 45.0 | 61.0 | 25.0 | 65.0 |
| oil wt % | 33.0 | 46.1 | 17.7 | 38.5 | 23.9 | 35.0 | 20.0 | 14.0 | 50.0 | 12.7 |
| additive wt % | 33.0 | 15.4 | 29.4 | 23.0 | 23.9 | 15.0 | 35.0 | 25.0 | 25.0 | 22.3 |
| name additive | J | J | J | J | J | J | J | J | J | J |
| VISUAL RATING | 5 | 6 | 8 | 8 | 9 | 4 | 1 | 10 | 10 | 4 |

A=Phosphate Ester; fatty alcohol blend phosphate esters; Rhodafac LO-11A LA from Rhodia HPCII of Cranberry, N.J.

B=Phosphate Ester; Bis(2-ethylhexyl)phosphate ester from Rhodia HPCII of Cranberry, N.J.

C=Phosphate Ester; Bis(2-ethylhexyl)+mono(2-ethylhexyl) phosphate esters from Rhodia HPCII of Cranberry, N.J.

D=Phosphonate Ester; 2-ethylhexyl bis(2-ethylhexyl)phosphonate ester from Rhodia HPCII of Cranberry, N.J.

E=Phosphate Ester; Tris(2-ethylhexyl)phosphate ester from Rhodia HPCII of Cranberry, N.J.

F=Fatty acids, unsaturated; linoleic and linolenic acids; Linseed Oil.

G=Fatty acids, unsaturated; eleostearic acid; Tung Oil.

H=Phosphonate Ester; octyl phosphonic acid ester from Rhodia HPCII of Cranberry, N.J.

I=PEG Esters; PEG-30 castor oil (ricinoleic+oleic+palmitic . . . ); Alkamuls EL-620 from Rhodia HPCII of Cranberry, N.J.

J=Sorbitan Esters; sorbitan monooleate; Alkamuls SMO from Rhodia HPCII of Cranberry, N.J.

K=Sulfosuccinate Ester; dioctyl sodium sulfosuccinate; OT-100 from Cytec Industries of Charlotte, N.C.

L=Sorbitan Ester; sorbitan monolaurate; Alkamuls SML from Rhodia HPCII of Cranberry, N.J.

M=Sorbitan Ester Ethoxylated; sorbitan trioleate; Alkamuls STO From Rhodia HPCII of Cranberry, N.J.

N=Aromatic Ethoxylate; dodecyl phenol ethoxylates; lgepal RC-630 From Rhodia HPCII of Cranberry, N.J.

O=Aromatic Ethoxylate; nonylphenol ethoxylates; lgepal CO-210 From Rhodia HPCII of Cranberry, N.J.

P=Aromatic Ethoxylate; nonylphenol ethoxylates; lgepal CO-630 From Rhodia HPCII of Cranberry, N.J.

Q=Alcohol Ethoxylate; mixed linear alcohol ethoxylates; Rhodasurf LA-3 from Rhodia HPCII of Cranberry, N.J.

R=Alcohol Ethoxylate; mixed linear alcohol ethoxylates; Rhodasurf LA-12 from Rhodia HPCII of Cranberry, N.J.

In the following examples, set out in Table 10, ultrahigh molecular weight polyethylene (GUR 4170 from Ticona LLC, Summit, N.J.), filler (silica, HiSil from PPG of Pittsburgh, Pa.), processing oil (naphthelenic oil from Calumet Co. of Pamaton, La.), and lubricant (as identified in the table) were mixed together and extruded from a Brabender extruder (BW Brabender Co. of South Hackensack, N.J.). In the control, 5.42 grams of UHMWPE was mixed with 14.65 g filler and 30.56 g oil. In the other examples, 5.42 grams of UHMWPE was mixed with 14.65 filler, 29.06 g oil and 1.50 g lubricant. This procedure is used to predict the lubricant's efficacy by observing fusion time and terminal torque. The fusion time is a measure of when the polymer dissolves in the oil (phase inversion of the polymer). The fusion time is typically the second peak on a plot of torque as a function of time. The fusion time typically occurs after a first peak which indicates wetting of the polymer by the oil. The terminal torque is measured after 10 minutes of mixing.

TABLE 10

| Additive | Fusion Time (sec) | Terminal Torque (mg) |
|---|---|---|
| Control - 59% Oil | 182 | 660 |
| Octyl PO4 | 42 | 501 |
| Antarox 724/P | 48 | 685 |
| Alkamide STEDA/B | 55 | 845 |
| Rhodasurf LA-12 | 61 | 633 |
| T(2EH)PO4 | 64 | 640 |
| Alkamuls SMO | 65 | 566 |
| Igepal CO-630 | 66 | 627 |
| Alkamuls STO | 66 | 553 |
| Alkamuls SML | 71 | 607 |
| Rhodasurf LA-3 | 74 | 545 |
| Alkamuls EL-620 | 83 | 583 |
| Igepal CO-210 | 88 | 528 |
| Igepal RC-630 | 92 | 601 |
| Linseed Oil | 92 | 650 |
| B(2EH)2EHP1 | 92 | 610 |
| 2EHAPO4 | 95 | 465 |
| DEHPA | 100 | 410 |
| Rhodafac LO-11A | 109 | 516 |
| Rhodapon BOS | 110 | 623 |
| Tung Oil | 114 | 647 |
| OT-75 | 115 | 820 |
| Rhodapex CD-128 | 122 | 570 |
| Miranol C2M-SF | 125 | 678 |
| Mirataine COB | 135 | 730 |
| Mirataine CBS | 135 | 752 |
| Miranate LEC-80 | 140 | 672 |
| Miranol JEM | 149 | 727 |
| Rhodapon UB | 152 | 892 |
| Supragil WP | 153 | 776 |
| Ca Stearate | 196 | 766 |
| Rhodacal N | 230 | 816 |
| Neustrene 059 | | |
| Neustrene 064 | | |
| Kemester 1000 | | |
| Rhodaquat DAET-90 | | |
| Rhodameen PN-430 | | |
| Rhodameen T-50 | | |
| Alkamuls GMS | | |
| Alkamuls EGDS | | |
| Alkamuls JK | | |

The present invention may be embodied in other forms without departing from the spirit and the essential attributes thereof, and, accordingly, reference should be made to the appended claims, rather than to the foregoing specification, as indicated the scope of the invention.

That which is claimed:

1. An article of manufacture comprising:
   an ultrahigh molecular weight polyethylene (UHMWPE) mixed with a filler, a processing oil, and a lubricant selected from the group consisting of: aromatic ethoxylated esters, mercaptan ethoxylates, phosphonate esters, alkylaryl ether sulfates, naphthalene sulfonates, sulfonated esters, alkylaryl ether carboxylates, amino quaternary amines, imidazoline derivatives, sultaines, aminopropionate, catechol derivatives, and combinations thereof, said lubricant is present in an amount from 0.2% to 15% by weight.

2. The article of manufacture of claim 1 wherein said lubricant is selected from the group consisting of: aromatic ethoxylated esters, phosphonate esters and combinations thereof.

3. The article of manufacture of claim 1 wherein a weight ratio of said ultrahigh molecular weight polyethylene to said filler ranges from 1:1 to 1:5.

4. The article of manufacture of claim 1 wherein said ultrahigh molecular weight polyethylene has a weight average molecular weight greater than $2 \times 10^6$.

5. A battery separator comprising a microporous membrane comprising the article of claim 1.

6. The battery separator of claim 5 wherein said battery is a lead acid battery.

7. An article of manufacture comprising:
   an ultrahigh molecular weight polyethylene (UHMWPE) having a weight average molecular weight greater than $5 \times 10^6$, mixed with a filler, a processing oil, and a lubricant selected from the group consisting of aromatic ethoxylated esters, mercaptan ethoxylates, phosphonate esters, alkylaryl ether sulfates, naphthalene sulfosuccinates, alkylaryl ether carboxylates, amino quaternary amines, imidazoline derivatives, sultaines, aminopropionate, catechol derivatives, and combinations thereof, said lubricant is present in an amount from 0.2% to 15% by weight.

8. The article of manufacture of claim 7 wherein said lubricant is selected from the group consisting of: aromatic ethoxylated esters, phosphonate esters and combinations thereof.

9. The article of manufacture of claim 7 wherein a weight ratio of said ultrahigh molecular weight polyethylene to said filler ranges from 1:1 to 1:5.

10. A battery separator comprising a microporous membrane comprising the article of claim 7.

11. The separator of claim 10 wherein said battery is a lead acid battery.

* * * * *